United States Patent
Crego

[11] 3,963,112
[45] June 15, 1976

[54] WINDGUARD FOR GRAIN DISTRIBUTOR

[75] Inventor: John B. Crego, New Holland, Pa.

[73] Assignee: Sperry Rand Corporation, New Holland, Pa.

[22] Filed: Mar. 14, 1975

[21] Appl. No.: 558,508

[52] U.S. Cl. .................................. 198/72; 198/65
[51] Int. Cl.² ........................................ B65G 47/44
[58] Field of Search ................ 198/47, 64, 65, 213, 198/43, 72; 214/17 C, 17 CB, 17 R, 42 R, 42 A, 42 B, 83.32, 17 D, 44 R

[56] References Cited
UNITED STATES PATENTS
| | | | |
|---|---|---|---|
| 2,377,760 | 6/1945 | Court | 214/42 A |
| 3,220,539 | 11/1965 | Anagnos | 198/213 |

*Primary Examiner*—Evon C. Blunk
*Assistant Examiner*—Joseph E. Valenza
*Attorney, Agent, or Firm*—C. Hercus Just; Frank A. Seemar; John R. Flanagan

[57] ABSTRACT

A windguard for the upper end of an upstanding grain discharge conduit having an auger therein and including a tubular wall of larger diameter than said conduit and surrounding the upper end thereof in radially spaced relationship thereto, the upper end of said tubular wall extending beyond the upper end of said conduit to provide a wind shield or guard, whereby when the auger is operated to discharge grain from the upper end of said conduit, it will fall through an annular space between said tubular wall and conduit, out of contact with wind blowing past said conduit. The tubular wall preferably is axially adjustable relative to the upper end of said conduit in order to accommodate different discharge rates of grain and/or different amounts or velocities of wind blowing past said conduit.

7 Claims, 4 Drawing Figures

WINDGUARD FOR GRAIN DISTRIBUTOR

BACKGROUND OF THE INVENTION

Grain is frequently distributed by various types of conduits, both horizontal and vertical, in which an auger rotates to conduct grain along the conduit and discharge it from one end thereof, for example. Without restrictions thereto, grain discharge conduits are employed in combines for purposes of conducting threshed grain from the threshing mechanism of the combine to a grain bin usually mounted in an upper part of the combine. Particularly when such conduit is disposed in an upstanding position either adjacent or within a grain bin on combines for example, it normally is found advantageous to dispose the upper end of such grain conduit at a level somewhat above that of the grain bin, whereby the grain bin may be filled by the conduit and the auger therein not only substantially to the limit of the rim of the bin but also mounded in the center of the bin above the rim thereof.

It has been found, particularly when the bin of a combine, for example, is being filled with grain when a relatively strong wind is blowing, that grain discharged from the upper end of the conduit will be blown beyond the rim of the grain bin and thus is wasted.

One type of grain bin employed in the combine and having generally upstanding grain conduits therein which discharge at the upper ends thereof is illustrated in U.S. Pat. No. 3,549,026, to Klee, dated Dec. 22, 1970. Although the upper ends of the grain filling conduits are shown in said patent with the upper end substantially even with the rim of the grain bin, it is not uncommon to have such upper end of the grain conduits extend above the rim of the grain bin, whereby grain discharging from the upper ends of such conduits is readily subject to being blown by a passing wind.

The problem of confining grain when discharging from the end of a conduit so as to be directed into bins or other receptacles intended to receive the same has been encountered in various prior structures, not only in combines but in other devices handling grain. For example, providing hoods on the discharge end of grain conduits to direct the same in a desired manner comprises the subject matter of prior U.S. Pat. Nos. 684,533, to Wettlaufer, dated Oct. 15, 1901, and 2,613,799, to Bawden et al, dated Oct. 14, 1952. A still further example of means to direct the discharge of grain from an auger is disclosed in U.S. Pat. No. 2,539,689, to Bobrowski, dated Jan. 30, 1951. One further U.S. Pat. No. 3,251,453, to Roboson Jr., dated May 17, 1966, shows a horizontal discharge tube having an auger therein and a shield means included in the discharge end of the tube to effect desired directing of the discharge material.

Although the aforementioned prior devices include certain types of shields associated with the discharge end of grain tubes and the like in which augers are employed, none of them seems to be suitably adapted to solve the problem of effectively or simply shielding grain discharging from the upper end of an upstanding conduit from contact by passing wind. Therefore, it is the object of the present invention to provide such a wind guard or shield which particularly is adapted to be mounted adjacent the upper end of a generally upstanding grain tube or conduit having auger type delivery means therein, details of which are set forth hereinafter.

SUMMARY OF THE INVENTION

It is the principal object of the present invention to provide a windguard or shield in the form of a relatively short tubular wall of greater diameter than that of the grain tube and mounted on the upper end of said grain tube in a manner to project upwardly beyond said tube a predetermined distance, said tubular wall being radially spaced from the upper end of the grain tube so as to provide an annular discharge space through which grain may fall by gravity while being shielded from contact by wind due to the guarding and shielding effect of the portion of the tubular wall which projects beyond the upper end of said grain tube.

It is another object of the invention to support said tubular wall upon said grain tube by means which permit axial adjustable movement of said wall relative to the upper end of said grain tube and thereby adapt the structure to accommodate different discharge rates of grain as well as to provide effective shielding of the discharging grain from contact by wind of different amounts and velocities.

It is a further object of the invention to support said tubular wall for axial adjustment upon the upper end of said grain tube by relatively simple bracket means that offer minimum obstruction to the passage of grain through the annular space between said tubular wall and grain tube, said adjustment of said tubular wall being accomplished by simple means and said adjustment being stabilized by suitable clamping bolts and the like.

It is still another object of the invention to adapt said tubular wall to the upper end of a grain tube in which the auger projects a limited distance beyond the upper end of the grain tube and a suitable bearing bracket is attached to said upper end of the grain tube to receive the upper end of the shaft of said auger and, ancillary to the foregoing object of the invention, it is a further object to dispose the supporting brackets for the tubular wall in circumferentially spaced relationship to the bearing bracket so as to provide minimum obstruction to the passage of grain between said grain tube and tubular wall.

One further object of the invention is to adapt the tubular wall shielding means to the upper end of a grain tube which is inclined a limited distance to the vertical and dispose the various brackets for the auger bearing and support of the tubular wall in locations nearest the vertical axis to which the grain tube is inclined, whereby the portion of the annular space between the tubular wall and upper end of the grain tube which is farthest from said vertical axis will be substantially free of brackets and therefor unobstructed and readily capable of freely discharging grain between said unobstructed portion of the tubular wall and the upper end of the grain tube.

Details of the foregoing objects and of the invention, as well as other objects thereof, are set forth in the following specification and illustrated in the accompanying drawings comprising a part thereof.

DETAILED DESCRIPTION

Figure 1:
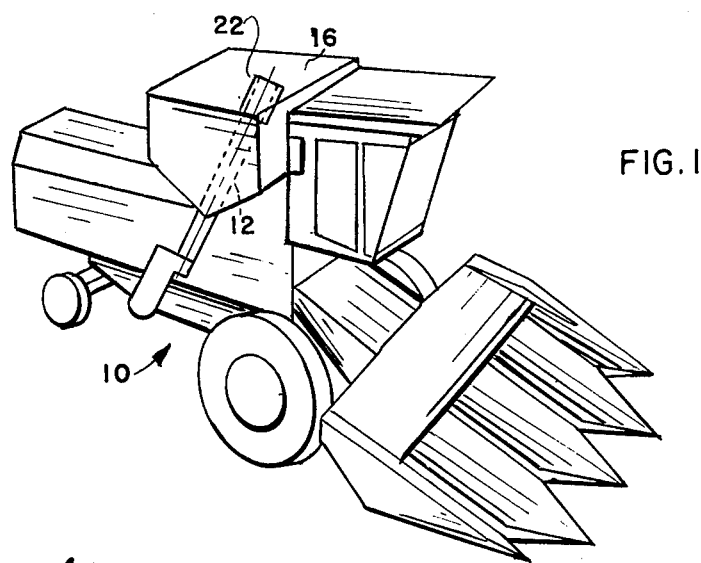
FIG. 1 is a perspective view of an exemplary combine of the type to which the present invention is applicable, said combine including a grain bin in which an upstanding grain tube is located for purposes of filling the bin, said grain tube embodying the principles of the present invention.

The windguard for a grain distributor which comprises the present invention may be employed in a variety of situations for distributing grain from a grain tube, for example, to a receptacle to receive the same. As indicated hereinabove, there is particular need for a windguard of such type in regard to a grain distributor such as employed in a combine 10 such as shown in FIG. 1, in which the grain tube 12, which has an auger 14 therein extends upwardly from a lower portion of the combine into the grain bin 16. It is conventional that the upper end of the grain tube 12 be disposed either substantially at a level with the upper rim of the grain bin 16 or at a higher elevation than said rim in order that grain, when discharged from the upper end of the grain tube, will be able to fill the grain bin 16 substantially to the full depth of the bin and even dispose the central part of the mass of grain at a higher level than the rim of the bin 16, thereby constituting a full load of grain for said bin.

Figure 4:
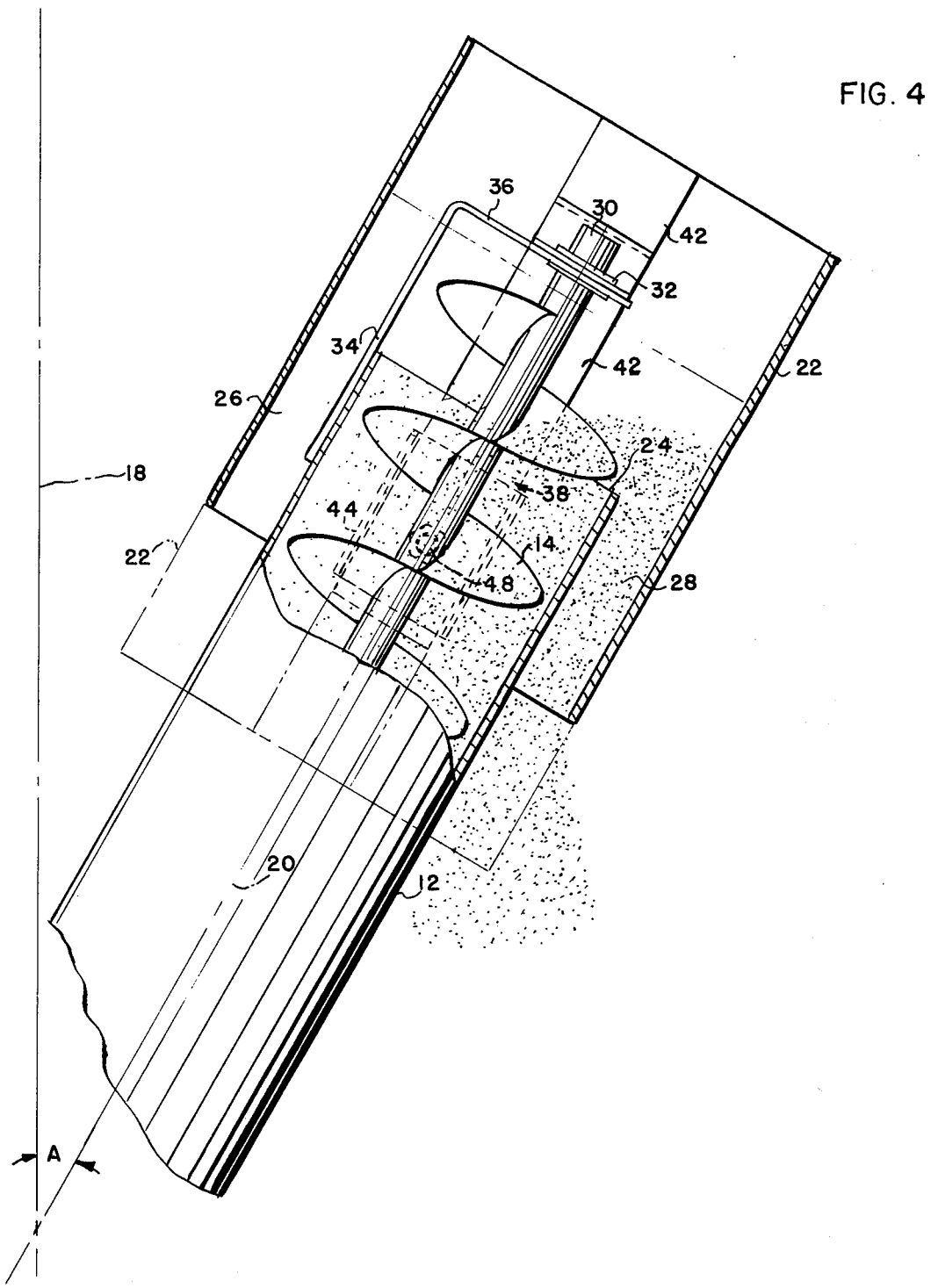
FIG. 4 is a fragmentary vertical sectional view taken on the line 4—4 of FIG. 2 and illustrating in full lines one exemplary position of the windguard tubular wall with respect to the upper end of the grain tube, and a different axial position of said tubular wall being illustrated in phantom.

It will be understood that the auger 14 is rotated by a conventional power means, not shown, but employed in combines of the type shown in exemplary manner in FIG. 1. The auger is rotated in a direction to elevate grain from the threshing and separating mechanism in the lower portion of the combine 10, to the upper end of the grain tube 12 for discharge of the same into the bin 16. Further, as shown in FIG. 4, it is conventional in mounting grain tubes 12 in grain bins, such as the bin 16 in a combine 10, to extend the tube at an incline to the vertical. For example, in FIG. 4, the vertical is indicated by an exemplary axis 18 and it will be seen that the axis 20 is at an inclined angle thereto indicated by an arc A which, for example, may be of the order of approximately 30°. Such designation is not intended to be restrictive however but merely exemplary. Other appropriate angles may be used.

Referring particularly to FIG. 4, it will be seen that the upper end of the grain tube 12 is provided with a preferably axially adjustable tubular wall 22 which comprises a windguard or shield which minimizes the possibility of the threshed grain, when discharged from the upper end 24 of grain tube 12, being blown beyond the confines of the bin 16. It will be seen from FIG. 4 that the tubular wall 22 is of greater diameter than that of the grain tube 12 and both of said elements preferably are cylindrical. The difference in diameters between the two elements is sufficient to provide a substantially annular space 26 between the inner surface of the tubular wall 22 and the outer surface of the upper end portion of the grain tube 12.

Also as illustrated in FIG. 4, it will be seen that as the auger 14 rotates in a direction to feed grain upwardly through the grain tube 12 to the upper end 24 thereof, the grain will discharge in the form of an exemplary stream 28 and fall by gravity from the lower end of the tubular wall 22, into the grain bin or any other receptacle with which the grain tube 12 is associated. From FIG. 4, it also will be seen that in view of the fact that the upper end of the tubular wall 22 extends substantially beyond the upper end 24 of grain tube 12, there is little if any possibility for wind passing over the upper end of the tubular wall 22 to carry any of the grain with it beyond the boundary of the grain bin 16.

For purposes of providing effective discharge of grain from the upper end of the tube 12, it is preferred that the upper end of the auger 14 extend beyond the upper end 24 of grain tube 12, as also shown in FIG. 4, said upper end of the auger terminating in a projecting end of the shaft 30 of the auger. Said shaft is received within a bearing 32 in the outer end of a bearing bracket 34 which, for example may be formed from a strip of steel or the like, of suitable width and thickness, one leg of the bracket being secured by welding or otherwise to the exterior surface of the grain tube 12 and the outer end 36 of said bracket, which supports the bearing 32, being disposed at a right angle to the leg thereof which is secured to tube 12. Further, it will be noted that the leg of the bracket 34 which is secured to the tube 12 is nearest the vertical axis 18, whereby the diametrically opposite portion of the annular space 26, from that in which the attached leg of the bracket 34 is located, is substantially free of obstruction with respect to grain being discharged into and from said annular space, as exemplified by the stream 28 in FIG. 4.

Figure 2:
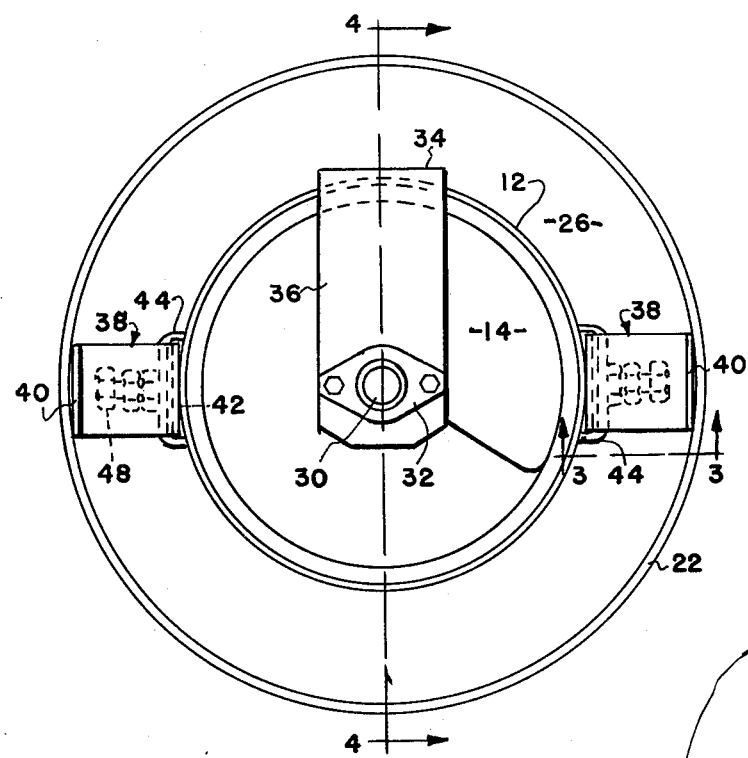
FIG. 2 is an enlarged plan view of the upper end of the grain tube shown in FIG. 1.
Figure 3:
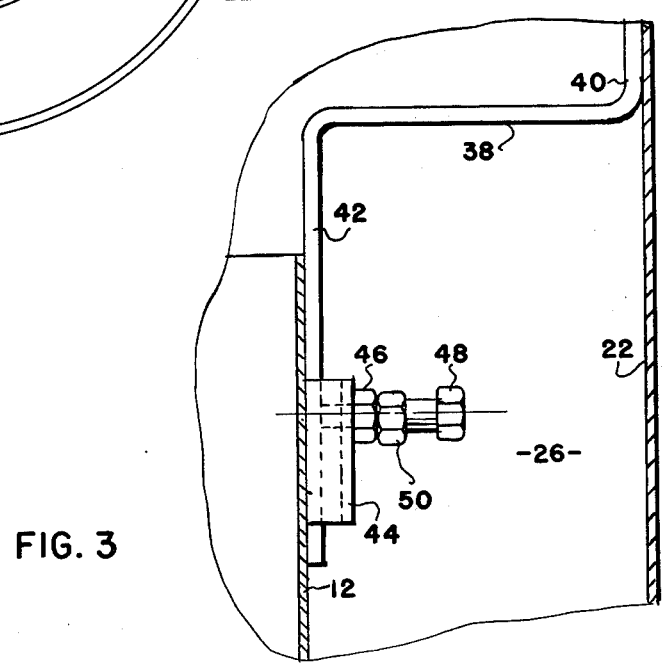
FIG. 3 is a fragmentary vertical elevation, on a substantially larger scale than employed in FIG. 2 and illustrating adjustable bracket supporting means for the tubular wall comprising a windguard which is axially adjustable relative to the grain tube, said view being taken on the line 3—3 of FIG. 2.

For purposes of supporting the tubular wall 22 which comprises the windguard with respect to the grain tube 12, attention is directed to FIGS. 2 and 3 in which it will be seen that, preferably, a pair of supporting brackets 38 are provided, preferably at diametrically opposite sides of grain tube 12 and tubular wall 22. The brackets 38 may be formed from suitable strip metal of appropriate width and thickness, such as steel, and one leg 40 of each bracket 38 is secured fixedly against the inner surface of the tubular wall 22, such as by welding or otherwise. Each bracket 38 also is provided with an offset leg 42 of suitable length to permit a limited range of axial adjustment of the tubular wall 22 relative to the upper end of grain tube 12. Two exemplary adjusted postions of the tubular wall 22 are illustrated in FIG. 4, one of these being in full lines and a lower position being indicated in phantom.

To permit such axial adjustment of the tubular wall 22 with respect to grain tube 12, the offset legs 42 thereof are received in suitable socket members 44 which are of limited length but adequate to provide effective support for the tubular wall 22 in a desired adjusted position. The socket members 44, in end view as seen in FIG. 2, are substantially U-shaped and the length of the legs of said brackets, which are firmly secured to the outer surface of grain tube 22 by any suitable means such as welding, are relatively short but adequate to provide a space capable of readily receiving the opposite legs 42 of the brackets 38 for ready slidable movement relative to said socket members.

A desired adjusted position of the tubular wall 22 with respect to the upper end of grain tube 12 is maintained by clamping means of suitable type. The means specifically shown in FIGS. 2 and 3 comprises an inexpensive manufactured expedient comprising a nut 46 welded to the outer surface of the socket member 44 and a clamping bolt 48 is threadably received through said nut and extends through an aligned hole in the outer wall of socket member 44 in order that the inner end of bolt 48 may engage in clamping manner the offset leg 42 of each bracket 38. After said bolts 48 have been tightened into clamping relationship with the legs 42, a locknut 50 is tightened upon the bolt 48 against the fixed nut 46.

It will be seen from FIG. 2 that the supporting brackets 38 are preferably disposed in diametrically opposed positions with respect to the axis of the auger 14 and bearing bracket 34 is disposed circumferentially midway between the supporting brackets 38, whereby it will be seen from FIG. 2 that the lower half of the annular space 26 between tubular wall 22 and grain tube 12 is free of obstruction by any of the brackets. In view of this, referring to FIG. 4, it will be seen that in the preferred construction of the windguard comprising the present invention, and especially when the grain tube 12 is mounted at an incline with respect to the vertical such as axis 18, said tube is arranged so that the bearing bracket 34 is positioned nearest the axis 18 and the supporting brackets 38 respectively are disposed at 90° thereto relative to the axis of auger 14, whereby said relatively unobstructed half circumference of the annular space 26 referred to above, which is between the grain tube 12 and tubular wall 22, is disposed farthest from the vertical axis 18, thereby providing said unobstructed portion of said annular space in a location where it is most advantageous for purposes of permitting ready discharge of the stream of grain 28 from the upper end of the grain tube 12 and permit the same to fall by gravity from the lower end of tubular wall 22 as shown in exemplary manner in FIG. 4.

It readily can be visualized that, depending upon the volume of grain being discharged from the combine, for example, and delivered to the grain tube 12, as well as the rate of operation of the auger 14, it will be desirable from time to time under certain circumstances to dispose the windguard comprising tubular wall 22 at different axial positions with respect to the upper end of grain tube 12 and this readily may be accomplished by loosening the locknuts 50 and clamping bolts 48, moving the tubular wall 22 in the desired axial direction, and then re-clamping the supporting brackets 38 with respect to the socket members 44. Such axial adjustment also may be found to be necessary or desirable under circumstances where prevailing wind demands that such adjustments be made to prevent grain from being blown beyond the confines of the receiving receptacle such as the grain bin 16 of the combine 10. The windguard comprising tubular wall 22, therefore, not only guards against the blowing of the grain by wind but also provides adjustability which may be found necessary to accommodate the rate of discharge of the grain in view of fact that, for example, a heavy rate of discharge will require the tubular wall 22 to be disposed a greater distance beyond the upper end of grain tube 12 than otherwise in order that a greater extent of the annular space 26 may be employed to comprise discharge means for the grain which passes by gravity through said annular space.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Grain distributing means for discharge into a receptacle comprising a grain tube adapted to be mounted in an upstanding manner within or adjacent a receptacle to receive grain from said tube, an auger mounted rotatably within said tube and adapted to conduct grain from the lower end of the tube to the upper end thereof, a windguard mounted upon the upper end of said tube and comprising a wall surrounding the upper end of said tube in radially spaced relation thereto to provide a circumferential discharge space between the upper end of said tube and said wall to receive grain discharged from the upper end of said tube and permit the same to fall by gravity downwardly through said discharge space and exit therefrom at the lower end of said wall, said wall being of limited length adequate to extend beyond the upper end of said tube and at least a short distance below the upper end of said tube, whereby said wall serves to prevent wind from blowing against grain discharging from the upper end of said tube, and means on the upper end of said tube adjustably engaging said surrounding wall for movement in an axial direction relative to said upper discharge end of said tube, thereby to adapt said discharge means to operate effectively during different grain discharge rates and wind conditions.

2. The grain distributing means according to claim 1 in which said means to adjust said surrounding wall relative to said tube comprises a supporting bracket member fixed at one end to the inner surface of said wall, a socket fixed to the exterior surface of said tube adjacent the outer end thereof and extending in parallel relation to the axis of said tube, said supporting bracket having an offset portion received within said socket for axial adjustable movement therewith, and means on said socket engageable with said offset portion of said supporting bracket to secure said surrounding wall in axially adjusted relation to the upper end of said tube.

3. The grain distributing means according to claim 2 in which said supporting bracket is formed from flat metal strip material and said socket comprises a flat substantially U-shaped bracket having legs of a length substantially equal to the thickness of said strip material of said supporting bracket and receiving the same in relatively close slidable relationship, and said securing means comprising a bolt threadably carried by said socket and movable into clamping engagement with said offset portion of said supporting bracket.

4. The grain distributing means according to claim 2 in which said surrounding wall is tubular and a plurality of said supporting brackets and sockets are secured respectively to said tubular surrounding wall and tube at substantially diametrically opposed positions to provide stable support for said tubular wall relative to said tube.

5. The grain distributing means according to claim 4 in which said auger has a flight which extends a limited distance beyond the upper end of said tube and a shaft fixed to the outer end of said auger, and said distributing means further including a bearing bracket fixed at one end to said tube and the other end extending laterally over the upper end of said tube and having a bearing thereon to receive said shaft on said upper end of said auger, and said supporting brackets and sockets being disposed on said tube and tubular wall at locations substantially 90° away from said bearing bracket relative to the axis of said tube.

6. The grain distributing means according to claim 5 in which said grain tube is inclined to the vertical at a limited angle and said bearing bracket being positioned nearest the vertical axis from which said tube is inclined, whereby the position of said supporting brackets relative to said bearing bracket disposes the inner surface portion of said tubular wall which is farthest from said vertical axis free of brackets and thereby unobstructed to permit ready discharge of grain between the upper end of said tube and said inner unobstructed surface of said tubular wall.

7. Grain distributing means for discharge into a receptacle comprising in combination an imperforate grain tube adapted to be mounted in an upstanding manner within or adjacent a receptacle to receive grain from said tube, an auger mounted rotatably within said tube and adapted to conduct grain from the lower end to the upper end thereof, one end of said auger extending a limited distance beyond the upper end of said tube, a windguard mounted on the upper end of said tube and comprising a tubular wall of larger diameter than said tube and of similar cross-sectional shape surrounding the upper end of said tube to provide a circumferential discharge space between said tube and tubular wall and entirely around the circumference of said tube, and means to support said tubular wall upon said tube with the upper end thereof extending axially a predetermined distance beyond the upper projecting end of said auger and the lower end extending below the upper end of said tube, said auger when rotated being adapted to convey grain upwardly in said tube for discharge of the same by gravity solely from the upper end of said tube and downwardly through said circumferential discharge space through which said grain falls downwardly by gravity into a receptacle, whereby the upper end of said tubular wall shields grain when discharging from the upper end of said tube from being blown by ambient air currents.

* * * * *